United States Patent [19]

Kim et al.

[11] Patent Number: 5,363,353
[45] Date of Patent: Nov. 8, 1994

[54] MAGNETO-OPTICAL DISK DRIVE HAVING MULTIPLE ELECTROMAGNET ELEMENTS

[75] Inventors: Young-woong Kim, Seoul; Ick-hyoung Yoo, Suwon; Chul-woo Lee, Seoul, all of Rep. of Korea

[73] Assignee: Samsung Electronics Co., Ltd., Kyunki-do, Rep. of Korea

[21] Appl. No.: 124,762

[22] Filed: Sep. 22, 1993

[30] Foreign Application Priority Data

Oct. 31, 1992 [KR] Rep. of Korea ............ 92-20330

[51] Int. Cl.⁵ ............................................. G11B 13/04
[52] U.S. Cl. ................................... 369/13; 360/114
[58] Field of Search ............... 369/13, 14; 360/114, 360/59, 102, 103, 104; 365/122

[56] References Cited

U.S. PATENT DOCUMENTS 5,237,547 8/1993 Ohkuma et al. ................ 369/13

FOREIGN PATENT DOCUMENTS

| 2230537 | 9/1990 | Japan | 369/13 |
| 4109403 | 4/1992 | Japan | 369/13 |
| 4114335 | 4/1992 | Japan | 369/13 |
| 4117648 | 4/1992 | Japan | 369/13 |
| 5101473 | 4/1993 | Japan | |

Primary Examiner—Robert J. Pascal
Assistant Examiner—Tan Dinh
Attorney, Agent, or Firm—Lowe, Price, LeBlanc & Becker

[57] ABSTRACT

An magneto-optical disk drive comprises a driving apparatus for rotating a medium, an electromagnet positioned above or below the medium for producing a magnetic field on a recording surface of the medium, and an optical head by which laser light illuminates the recording surface and the laser light reflected from the recording surface is picked up. Here, the electromagnet comprises a plurality of subdivided electromagnet elements, a magnetic field concentrator by combining the electromagnet elements in a magnetic circuit and concentrating magnetic fields produced from the combined electromagnet elements on a portion of the electromagnet, and a center magnetic pole provided in an opposing position with respect to the optical head, to thereby make the magnetic field concentrated by the magnetic field concentrator pass through the recording surface of the medium. Accordingly, the recording time or data on the medium becomes greatly shortened, thereby enabling high speed data recording.

12 Claims, 3 Drawing Sheets

MAGNETO-OPTICAL DISK DRIVE HAVING MULTIPLE ELECTROMAGNET ELEMENTS

BACKGROUND OF THE INVENTION

The present invention relates to a magneto-optical disk drive, and more particularly to a magneto-optical disk drive in which an electromagnet for an optical head is formed as a plurality of subdivided electromagnet components, and the magnetic fields from the respective subdivided electromagnet components are concentrated to obtain a desired intensity of the magnetic force, and at the same time the respective LC time constants are lowered, thereby enabling high-speed data processing.

In a general magneto-optical disk player, laser light is illuminated on a recording layer of a medium which rotates by a driving apparatus. Accordingly, the recording layer of the medium is heated so that magnetization of the recording layer can be inverted. At the same time, a strong magnetic field coming from a separately provided electromagnet passes through a recording surface. Accordingly, recording is performed according to a discriminative local magnetic field direction of the recording medium.

In this case, an inverted signal of the magnetic field is considerably lower than that of the non-inverted signal to be recorded. Thus, if a signal should be recorded over the signal previously recorded on the medium, the previously recorded data is erased, to then record the desired data. Therefore, during recording, a predetermined time interval is required to erase the previously recorded data.

To solve the above problem, a number of over-writing methods have been proposed. In such conventional magneto-optical disk players, as shown in FIGS. 1 and 2, laser light 31 from a laser head 3 provided below a medium 5 rotated by a driver 4, illuminates a recording layer 53 of the medium. Accordingly, recording layer 53 of medium 5 is heated so as to invert its magnetization-inverted. Simultaneously, a strong magnetic field from electromagnet 1 is provided above medium 5 passes through recording layer 53. Accordingly, the induced discriminative local magnetic field direction of recording layer 53 is established. Electromagnet I is fixed to a sleigh-shaped slider 2, so that electromagnet 1 can be reciprocated by a predetermined distance along the surface of recording layer 53. Electromagnet 1 is applied with a high-frequency signal. To reduce the time constant of the electromagnet due to the high-frequency drive of the magneto-optical disk drive having such an over-writing structure, the electromagnet should be installed as close as possible to the recording surface of the medium. Generally, the depth of protection layers 51 and 52 for protecting the recording layer of the medium is in the neighborhood of several micrometers. On the other hand, the distance between the front end of slider 2 and recording layer 53 of medium 5 which are opposed to each other should be kept at 10 to 20 μm.

However, the magneto-optical disk drive having such an over-writing method has two significant drawbacks.

Firstly, considering the aforementioned distance between slider 2 and the surface of medium 5, the use of such an over-writing method is difficult in operational circumstances in which foreign matter such as hair, dust, etc., exists. Also, due to magnetic friction between slider 2 and medium 5, the surface of protecting layers 51 can be easily damaged.

Secondly, a transparent protecting layer 54 having a thickness of 1.2 mm should be formed on the side which receives the laser beam which is incident to the upper portion of recording layer 53. However, for double-sided recording on medium 5, the distance between electromagnet 1 and recording layer 53 becomes increased due to the combined thickness of protecting layers 51 and 52. Accordingly, the formation of a magnetic field having the necessary intensity is difficult. Thus, in the conventional method, only a single-sided medium can be used, resulting in reducing the recording capabilities of the medium.

SUMMARY OF THE INVENTION

Therefore, to solve the defects as described above, it is an object of the present invention to provide a magneto-optical disk drive having a simple structure adopting a double-sided recording method, at an inexpensive production cost.

To accomplish the above object of the present invention, there is provided a magneto-optical disk drive comprising:

a driving apparatus for rotating a medium;

an electromagnet which is positioned above or below the medium for producing a magnetic field on a recording surface of the medium; and an optical head by which laser light illuminates the recording surface and the laser light reflected from the recording surface is picked up, wherein the electromagnet comprises a plurality of subdivided electromagnet elements, magnetic field concentration means by combining the electromagnet elements in a magnetic circuit and concentrating magnetic fields produced from the combined subdivided electromagnet elements on a portion of the electromagnet, and a center magnetic pole provided in an opposing position with respect to the optical head, such that the concentrated magnetic field passes through the recording surface of the medium.

In the present invention as described above, the respective electromagnet elements are diametrically disposed anti centered on the center magnetic pole of the electromagnet, with a predetermined angle maintained between all adjacent electromagnet elements. Each of the respective first magnetic poles of the respective elements is directly connected to the center magnetic pole by a main magnetic rod as a magnetic field concentration means.

Preferably, in addition to the above structure, an auxiliary magnetic field concentration means is provided in a position opposite the electromagnet and centering on the medium. In the auxiliary magnetic field concentration means, the auxiliary magnetic rod is disposed in such a manner having a shape that the auxiliary magnetic rod corresponds to the main magnetic rod, in which each one end is positioned so as to face to the first magnetic pole of the corresponding electromagnet element, while each of the other ends is positioned so as to face to the center pole. Accordingly, each of the auxiliary magnetic rod has a structure which constitutes a magnetic closed circuit for circulating a magnetic field from the corresponding electromagnet element, together with the corresponding main magnetic rod.

By doing so, a desired intensity of the magnetic field can be obtained through the center magnetic pole. In this case, since the electromagnet is separated into a number of elements which maintain a predetermined distance between adjacent elements, inductance is lowered and mutual induction is suppressed, resulting in accomplishing a very short lime constant.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE INVENTION

The magneto-optical disk drive according to the present invention basically comprises a driver for totaling a medium, an electromagnet positioned above or below the medium for producing a magnetic field on a recording surface of the medium arid a laser head for irradiating laser light onto the recording surface on which a magnetic field is formed and receiving the laser light reflected from the recording surface. Except for the following featured elements of the present invention, many elements of the conventional magneto-optical disk drive are included therein, and design modifications are possible.

Figure 1:
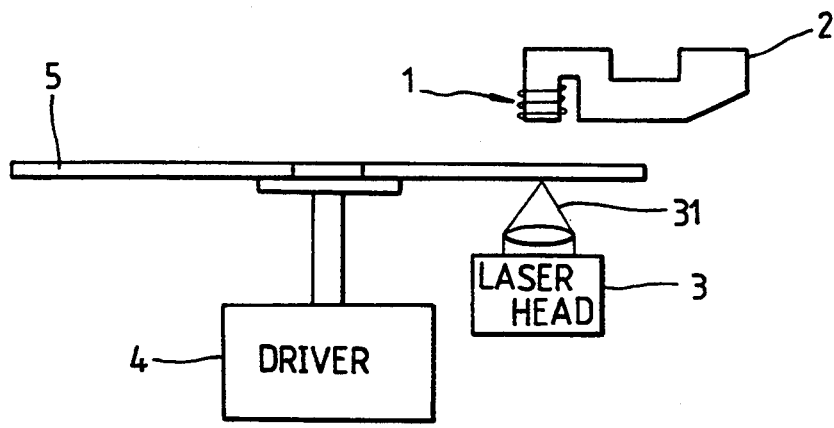
FIG. 1 is a side view showing the relationship between a disk and an optical head of a conventional magneto-optical disk drive.
Figure 2:
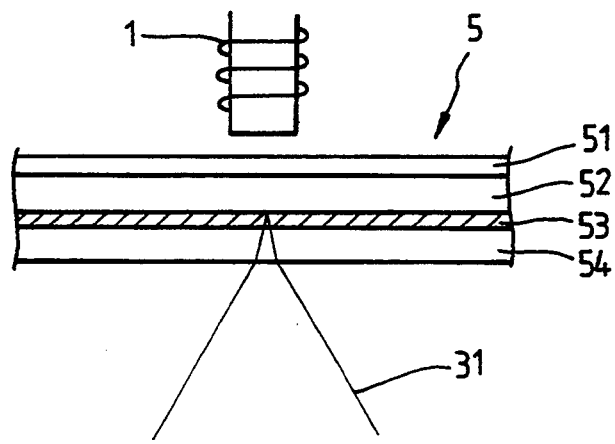
FIG. 2 is an enlarged view of a portion shown in FIG. 1.
Figure 3:
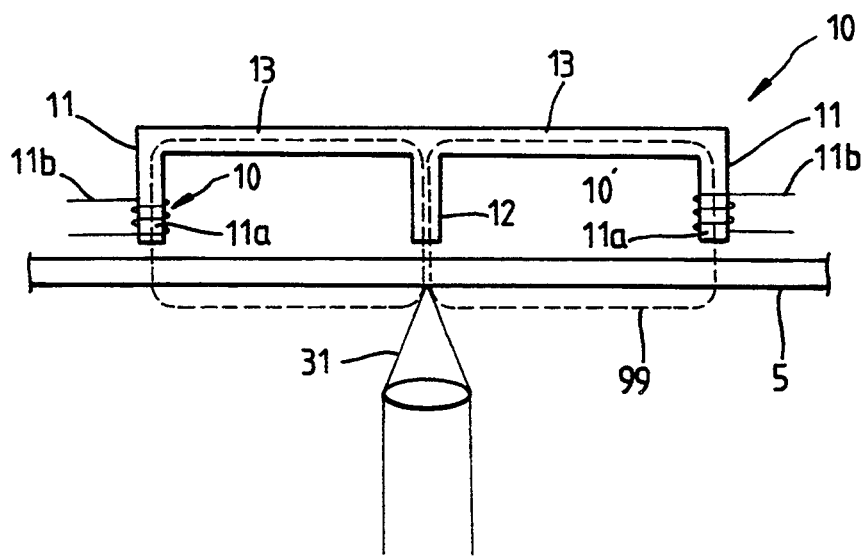
FIG. 3 is a partially extracted cross-sectional view of one embodiment of a magneto-optical disk drive according to the present invention.

FIG. 3 shows essential elements in a magneto-optical disk drive of a first embodiment of the present invention.

Figure 5:
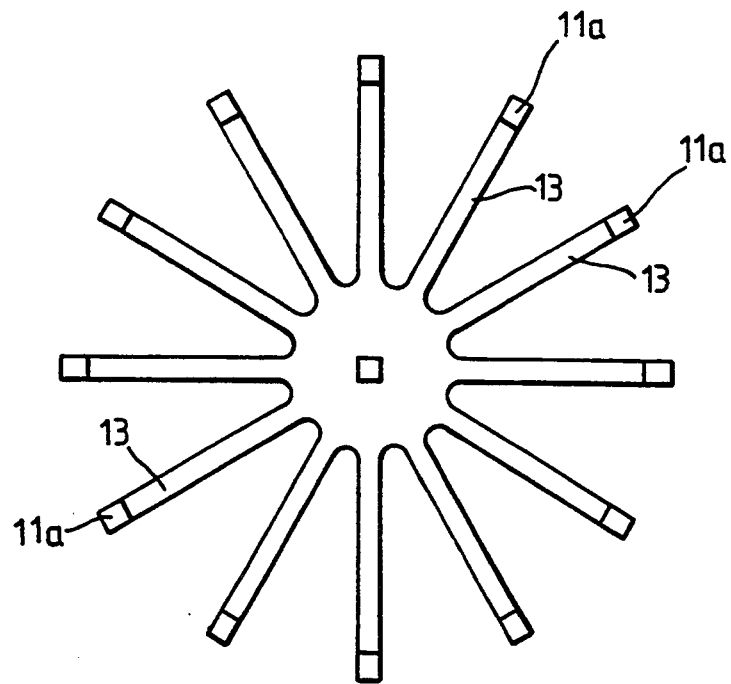
FIGS. 4 and 5 are a schematic perspective view and a plan view of the electromagnet shown in FIG. 3 according to the present invention, respectively.
Figure 4:
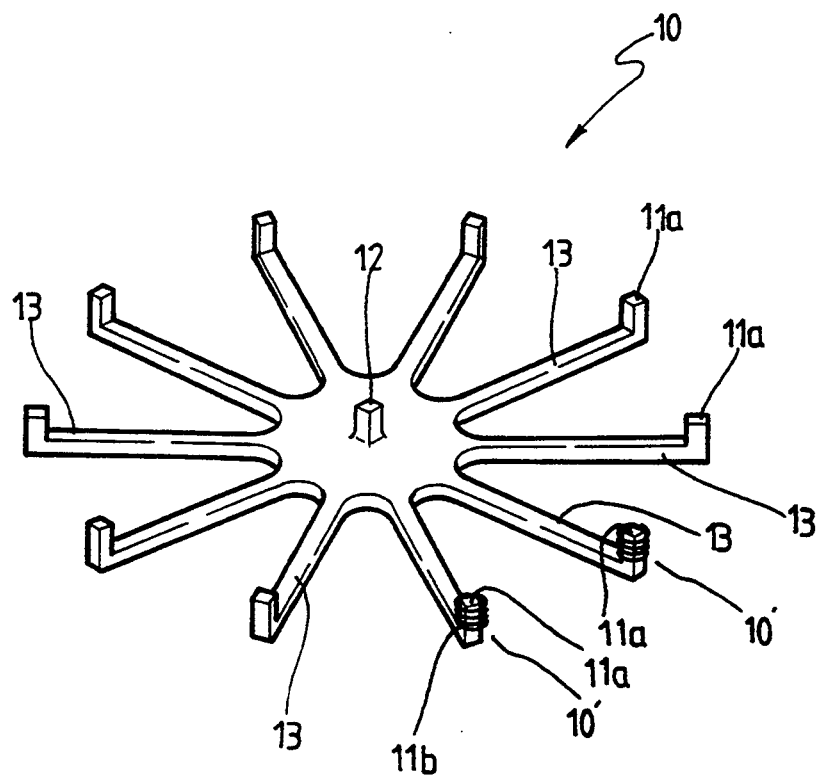
Figure 7:
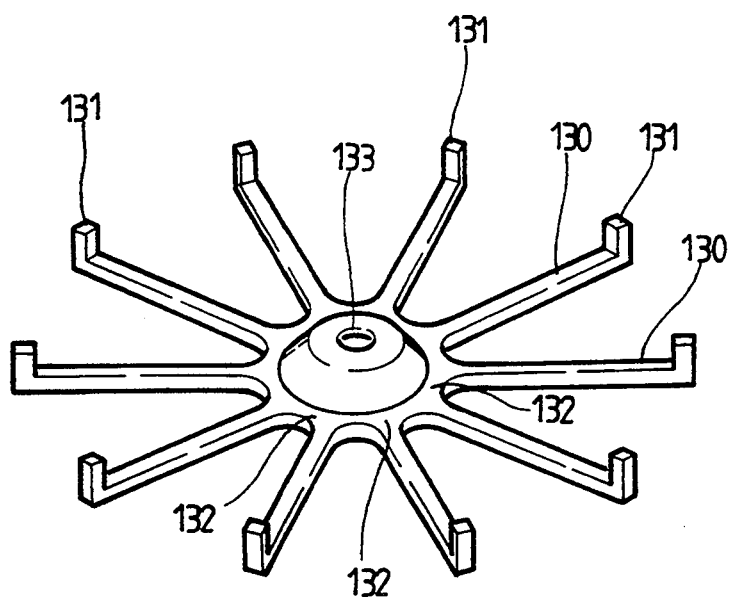
FIG. 7 is a schematic perspective view of a magnetic field concentration apparatus of the magneto-optical disk drive shown in FIG. 6.

Below medium 5 is provided an optical head 3, while above medium 5 is provided an electromagnet 10 which characterizes the present invention. Electromagnet 10 comprises a plurality of subdivided electromagnet elements 10', magnetic rods 13 and 13' for combining the electromagnet elements in a manner of forming a magnetic circuitry and concentrating magnetic fields produced from the electromagnet elements on a portion of the electromagnet 10, and a center magnetic pole 12 for making the concentrated magnetic field by the magnetic rods 13 and 13' pass through a recording surface of the medium on which the laser light is concentrated. Each of electromagnet elements 10' includes core 11a and coil 11b. Core 11a, the magnetic rod and the center pole of each element of the electromagnet has a spoked structure as shown in FIGS. 4 and 5. Here, it is desirable to form the electromagnet as a single body in view of facilitating manufacture and enhancing the efficiency of the use of magnetism.

Such a structure enables a desired intensity of the magnetic field through a number of the electromagnet elements, in which the magnetic forces of the respective elements are reduced by as much as an amount of the divided element when compared with that using a single electromagnet. According to such a structure, each of the respective elements 10' not only has a low inductance with center pole 12 opposite to head 3 of FIG. 6, but also are radially disposed with a predetermined angle maintained between the adjacent elements around the center pole to suppress mutual induction. Thus, the time constant becomes very short, to enable high speed drive.

As described above, although the present invention may obtain a desired magnetic field, inductance of the electromagnet is not only reduced for a high speed drive, but also mutual induction between the elements is suppressed.

According to the present invention as described above, the high speed drive becomes possible. In addition to the above embodiment structure, a more efficient magnetic field use becomes possible by a second embodiment which will be described below.

Figure 6:
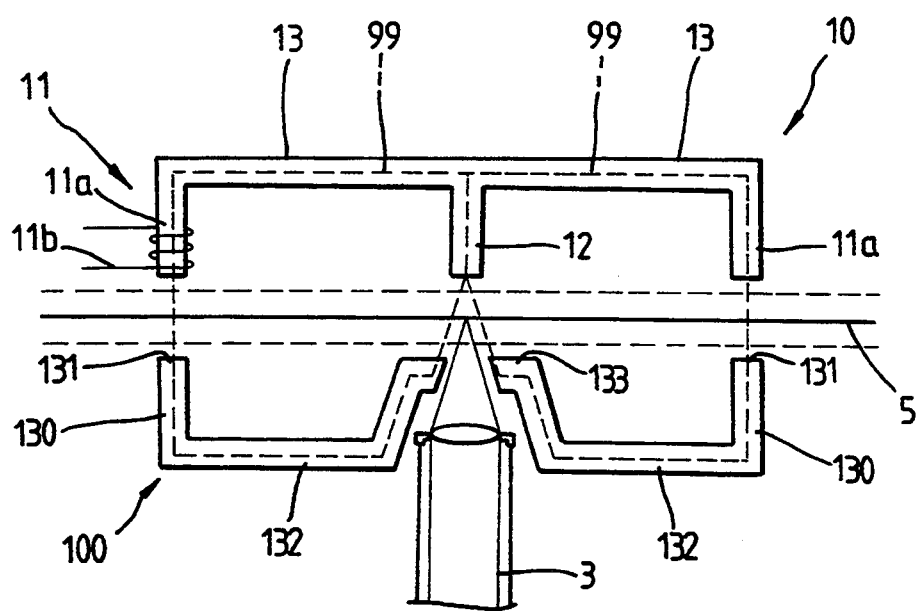
FIG. 6 is a partially extracted cross-sectional view of another embodiment of a magneto-optical disk drive according to the present invention.

Referring to FIG. 6, auxiliary magnetic field concentrator 100 is provided opposite electromagnet 10 and centering medium 5. In auxiliary magnetic field concentrator 100, auxiliary magnetic rod 130 corresponding to main magnetic rod 13 is disposed in a spoked configuration. Here, magnetic pole 131 of each outer end of the auxiliary magnetic rod 130 faces the corresponding electromagnet element, while magnetic poles 132 of the other (inner) end thereof constitute a donut-shaped auxiliary center magnetic pole 133 for enclosing the periphery of head 3. Auxiliary center magnetic pole 133 formed as described above is positioned opposite center magnetic pole Accordingly, each auxiliary magnetic rod 130 constitutes a magnetic closed circuit 99 forming a figure eight together with the corresponding main magnetic rod for circulating the magnetic field from the corresponding electromagnet element.

The second embodiment having such a structure can achieve a stronger magnetic field than can the first embodiment. Accordingly, the magnetic field of each electromagnet element can be weakened with respect to the first. embodiment. As a result, the inductance of an electromagnet element becomes much smaller. Also, the mutual induction with respect to the other elements is far better suppressed. Accordingly, the time constant becomes further reduced.

The embodiments of the present invention as described above are parts of various exercisable examples but do not limit the present invention thereto. The present invention divides an electromagnet into a plurality of spaced and isolated electromagnet elements to get a desired magnetic field, reduces inductance of each element to simultaneously suppress mutual induction and enable high speed modulation. As a result, the time necessary for recording data on a medium is greatly reduced. The present invention is adapted to a high speed magneto-optical disk drive having a double-sided recordable overwriting method.

What is claimed is:

1. A magneto-optical disk drive comprising:
    a driving apparatus for rotating a medium;
    an electromagnet positioned above or below the medium for producing a magnetic field on a recording surface of the medium; and
    an optical head by which laser light illuminates the recording surface and the laser light reflected from the recording surface is picked up,
    wherein said electromagnet comprises a plurality of subdivided electromagnet elements, magnetic field concentration means by combining the electromagnet elements in a magnetic circuit and concentrating magnetic fields produced from the combined electromagnet elements on a portion of the electromagnet, and a center magnetic pole which provided in an opposing position with respect to the optical head, to make the magnetic field concentrated by the magnetic field concentration means pass through the recording surface of the medium.

2. The magneto-optical disk drive according to claim 1, wherein said respective electromagnet elements are radially disposed and centered on the center magnetic pole of the electromagnet, with a predetermined angle between adjacent electromagnet elements maintained around a circumference, with a result that each of the respective first magnetic poles of the respective elements is directly connected to the center magnetic pole by a main magnetic rod as a magnetic field concentration means.

3. The magneto-optical disk drive according to claim 2, wherein said magnetic poles and said center pole are integrally formed.

4. A magneto-optical disk drive comprising:
a driving apparatus for rotating a medium:
an electromagnet positioned above or below the medium for producing a magnetic field on a recording surface of the medium: and
a laser head by which laser light illuminates the recording surface and the laser light reflected from the recording surface is picked
wherein said electromagnet comprises a plurality of subdivided electromagnet elements, magnetic field concentration means by combining the electromagnet elements in a magnetic circuit and concentrating magnetic fields produced from the combined electromagnet elements on a portion of the electromagnet, and a center magnetic pole which provided in an opposing position with respect to the laser head, to make the magnetic field concentrated by the magnetic field concentration means pass through the recording surface of the medium, and
wherein said magnetic field concentration means comprises an auxiliary magnetic field concentration means positioned opposite said electromagnet and centering on said medium.

5. The magneto-optical disk drive according to claim 4, wherein, in said auxiliary magnetic field concentration means, an auxiliary magnetic rod is disposed such that the auxiliary magnetic rod corresponds to a main magnetic rod, in which each outer end is positioned so as to face to a first magnetic pole of a corresponding electromagnet element, while each inner end is positioned so as to face to said center pole, thereby constituting a magnetic closed circuit for circulating a magnetic field from the corresponding electromagnet element, together with the corresponding main magnetic rod.

6. The magneto-optical disk drive according to claim 5, wherein said magnetic poles and said center pole are integrally formed.

7. The magneto-optical disk drive according to claim 4, wherein said respective electromagnet elements are radially disposed and centered on the center magnetic pole of the electromagnet, with a predetermined angle maintained between all adjacent electromagnet elements, with a result that each of the respective first magnetic poles of the respective elements is directly connected to the center magnetic pole by a main magnetic rod as a magnetic field concentration means.

8. The magneto-optical disk drive according to claim 5, wherein said respective electromagnet elements are radially disposed and centered on the center magnetic pole of the electromagnet, with a predetermined angle maintained between all adjacent electromagnet elements, with a result that each of the respective first magnetic poles of the respective elements is directly connected to the center magnetic pole by a main magnetic rod as a magnetic field concentration means.

9. The magneto-optical disk drive according to claim 6, wherein said respective electromagnet elements are radially disposed and centered on the center magnetic pole of the electromagnet, with a predetermined angle maintained between all adjacent electromagnet elements, with a result that each of the respective first magnetic poles of the respective elements is directly connected to the center magnetic pole by a main magnetic rod as a magnetic field concentration means.

10. The magneto-optical disk drive according to claim 7, wherein magnetic poles of the respective auxiliary magnetic rods in said auxiliary magnetic field concentration means adjacent to said head constitute a donut-shaped auxiliary center magnetic pole enclosing the periphery of said head.

11. The magneto-optical disk drive according to claim 8, wherein magnetic poles of the respective auxiliary magnetic roots in said auxiliary magnetic field concentration means adjacent to said head constitute a donut-shaped auxiliary center magnetic pole enclosing the periphery of said head.

12. The magneto-optical disk drive according to claim 9, wherein magnetic poles of the respective auxiliary magnetic rods in said auxiliary magnetic field concentration means adjacent to said head constitute a donut-shaped auxiliary center magnetic pole enclosing the periphery of said head.

* * * * *